Figure 1:
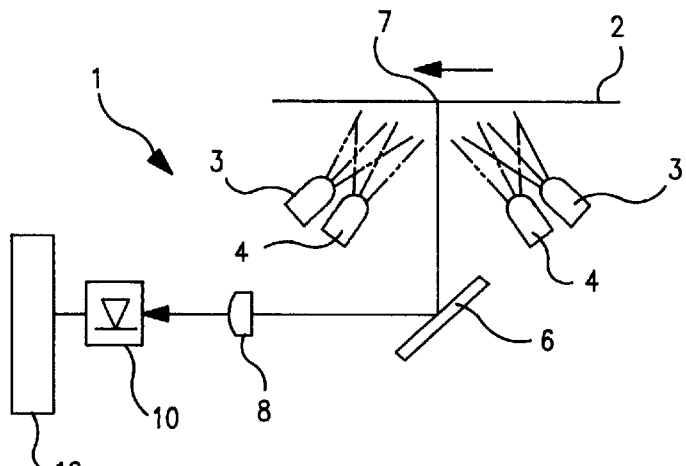

United States Patent [19]
Nordström

[11] Patent Number: 6,111,669
[45] Date of Patent: Aug. 29, 2000

[54] METHOD AND APPARATUS FOR READING A COLORED DOCUMENT

[76] Inventor: Ragnar Nordström, Vikingagatan 37 S-753 34, Uppsala, Sweden

[21] Appl. No.: 09/060,704

[22] Filed: Apr. 15, 1998

[30] Foreign Application Priority Data

Apr. 15, 1997 [SE] Sweden ................................. 9701400

[51] Int. Cl.⁷ ...................................................... H04N 1/46
[52] U.S. Cl. ........................... 358/516; 358/518; 358/509
[58] Field of Search ..................................... 358/504, 509, 358/520, 465, 475, 515; 356/407, 425; 250/234, 235, 556, 566; 355/516, 518

[56] References Cited

U.S. PATENT DOCUMENTS

| | | | |
|---|---|---|---|
| 4,830,501 | 5/1989 | Terashita | 356/402 |
| 4,907,078 | 3/1990 | Hasebe | 358/81 |
| 4,970,585 | 11/1990 | Kurata | 358/75 |
| 5,121,137 | 6/1992 | Taki et al. | 358/75 |
| 5,241,378 | 8/1993 | Nishiguchi | 358/515 |
| 5,245,418 | 9/1993 | Gilmour et al. | 358/527 |
| 5,345,320 | 9/1994 | Hirota | 358/518 |
| 5,377,024 | 12/1994 | Dillinger | 358/520 |
| 5,959,290 | 9/1999 | Schweid et al. | 250/235 |

FOREIGN PATENT DOCUMENTS

| | | |
|---|---|---|
| 0476294 | 3/1992 | European Pat. Off. . |
| 0492065 | 7/1992 | European Pat. Off. . |
| 0504576 | 9/1992 | European Pat. Off. . |
| 0576704 | 1/1994 | European Pat. Off. . |
| 2661529 | 10/1991 | France . |
| 57-150270 | 9/1982 | Japan . |
| 61-204782 | 9/1986 | Japan . |

*Primary Examiner*—Jerome Grant, II
*Attorney, Agent, or Firm*—Orum & Roth

[57] ABSTRACT

The present invention regards a method and an apparatus for reading data on an object document, wherein the document has areas for markings with different reflective characteristics. The document is illuminated with differently colored light and the reflective characteristic is analyzed to determine the color of detected markings on the document.

14 Claims, 4 Drawing Sheets

METHOD AND APPARATUS FOR READING A COLORED DOCUMENT

The present invention relates to a method and an apparatus for reading an image having image information in different colors, and, more particularly, to a method and an apparatus for analysing differently coloured image information.

Such an apparatus having differently coloured light sources for illuminating an image with differently coloured light is known for example through U.S. Pat. No. 4,670,779. Another apparatus of this kind for analysing differently coloured parts of a picture is known for example through WO 93/05480. In WO 93/05480 an object image is scanned with a light sensitive detector device having a certain scan frequency, whereby an elongate part of the object image is read into a memory with each scan. The object is illuminated with one color at a time concurrently with the scan frequency. In the case with two colors, e.g. red and green, the light source is alternated such that each second scan is illuminated with red light and green light respectively. This results in two pictures, each having half the possible resolution, viz. a red one wherein image information not reflecting red light is visible, and a green one wherein image information not reflecting green light is visible.

Object reading apparatuses of this kind operate with a relative movement between the object picture and a light sensitive scanning device. A drawback with the state of the art technology of alternating light having different colors is i.a. that a part of a scan, especially close to the transfer between a first and a second scan, is illuminated with light having the wrong color for that particular scan. This leads to an uncertain interpretation of a part of the picture. Furthermore, illuminating light alternating with the scan frequency is carried out on the expense of the resolution, and detecting a fill resolution picture by illuminating each part of the picture with both or all colors would on the other hand be carried out on the expense of the scanning speed.

The object of the present invention is to provide a method and an apparatus that eliminates the problem of illuminating light having alternating colors.

The problem is solved by a method and an apparatus according to the independent claims.

The physical background of color separation, i.e. the ability to distinguish between surfaces having different colors, is based on the fact that a surface that is perceived as having a particular color in reality has the characteristic property that it reflects light of a particular wavelength or a particular wavelength range and absorbs light of other wavelengths. Different surfaces reflecting light of different wavelengths can be distinguished by the human eye due to a perceived contrast between the reflection characteristics of the respective surfaces. For example, consider a light source radiating white light, which consists of a wide spectrum of light wavelengths with components from different color spectra. Imagine that this light source illuminates a first surface reflecting light of all wavelengths and a second surface reflecting light of a particular wavelength only, e.g. within the red spectrum. The first surface reflects light having components from all wavelengths or color spectra of the illuminating light and will therefore be perceived as white, whereas the second surface in accordance with its reflection characteristic only reflects the exemplifying red component of the white light. In contrast, if the same surfaces would be illuminated with light within the exemplifying red wavelength spectrum, both surfaces would reflect the red illuminating light and it would be impossible to distinguish between them.

An apparatus performing color separation on image information may thus be based on the fact that a marking on the object image in a particular color is indistinguishable from a substantially white surrounding if the object is illuminated with light of the same color as the marking, due to the above described reasons. On the other hand, a marking having a color differing from the illuminating color absorbs illuminating light and thereby becomes distinguishable from the same substantially white surrounding.

The invention is based on the inventor's realisation that a light sensitive scanning device having a light intensity detector and operating on an object image, which is illuminated simultaneously with light of more than one differing wavelengths or wavelength ranges, detects light reflected from the object image with contributions from all the illuminating wavelengths. In daily speech, the differing wavelengths or wavelength ranges are referred to as colors or coloured light and these terms will also be used in the following description. Depending on the selected type of light sensor in different embodiments, the reflected light is basically sensed or detected with respect to its intensity level, which corresponds to the energy content of reflected photons. In any case, it should be appreciated that the sensed light is composed of components dependent on each of the differing light wavelengths. For the sake of simplicity, the inventive principle will be illustrated hereinafter with exemplifying embodiments using illuminating light of two different colors.

In an example of illuminating light of the two colors red and green, a light detector output signal V representing e.g. a detected light intensity level is composed of signal components R (red) and G (green) dependent on each color. With calibration factors k and m for each respective color, the detector output signal can be formulated as a function $V = k*R + m*G$.

A substantially white background color on the object image will reflect light of both colors and thereby give rise to a maximum signal level V. A marking on the object image only reflecting light of one of the colors, e.g. red, and absorbing other colors, thereamong green, will only give rise to a contribution in the detector output signal from the green component G. In fact the maximum signal level for a detected marking of this color will be the calibration factor m times signal component G, i.e. $m*G$. Likewise, a marking only reflecting light of the other color, in this case green, will only give rise to a contribution in the detector output signal from the red component R, and the maximum signal level for a detected marking of this color will be the calibration factor k times signal component R, i.e. $k*R$. Threshold levels corresponding to the maximum signal levels for each color may thus be set in order to discriminate between makings having one or the other of the selected colors. A marking that absorbs light of both the selected illuminating colors, i.e. having a third color e.g. blue, will give rise to a detector output signal with contributions from both color components. However, since the marking absorbs light of both illuminating colors, the signal level will be lower than the maximum level for each respective color component taken by itself.

Figure 2:
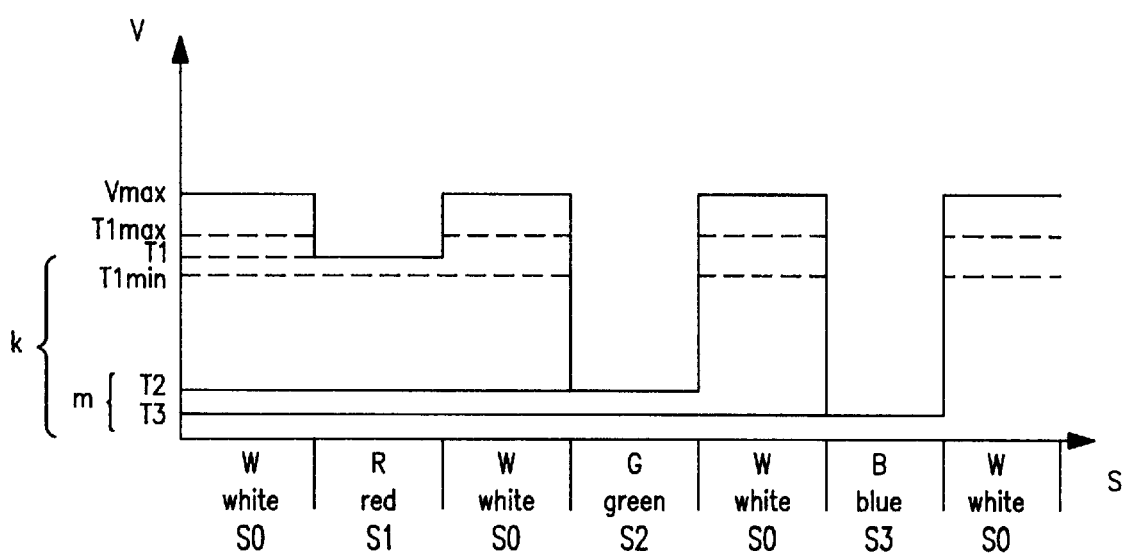
Figure 3:
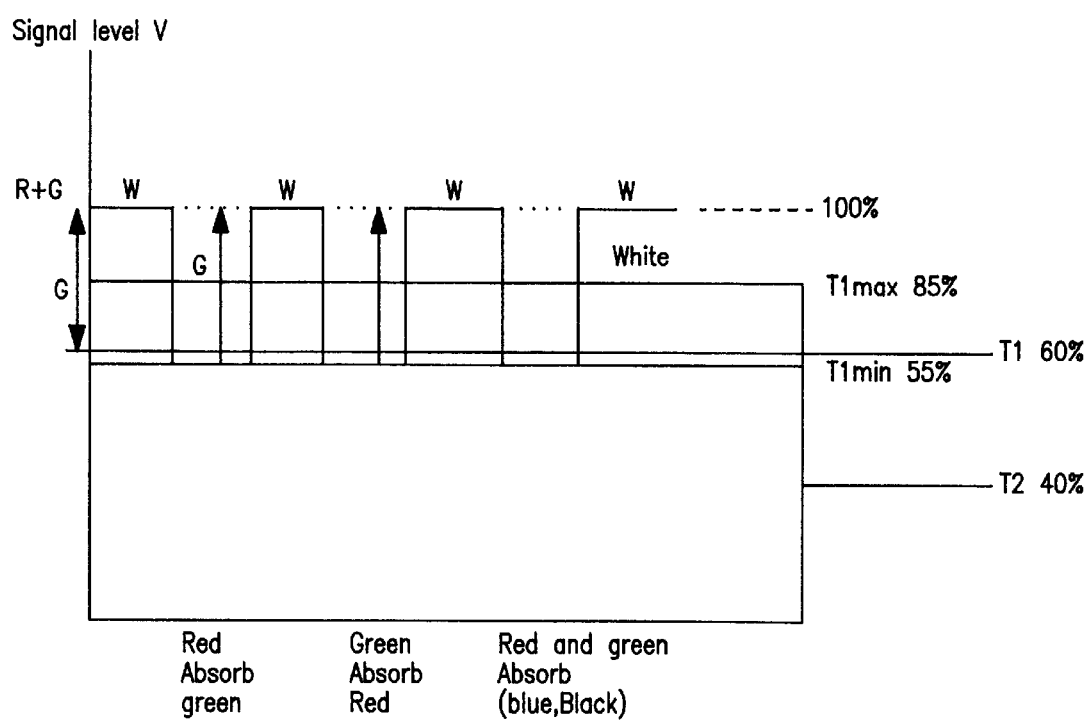
Figure 4:
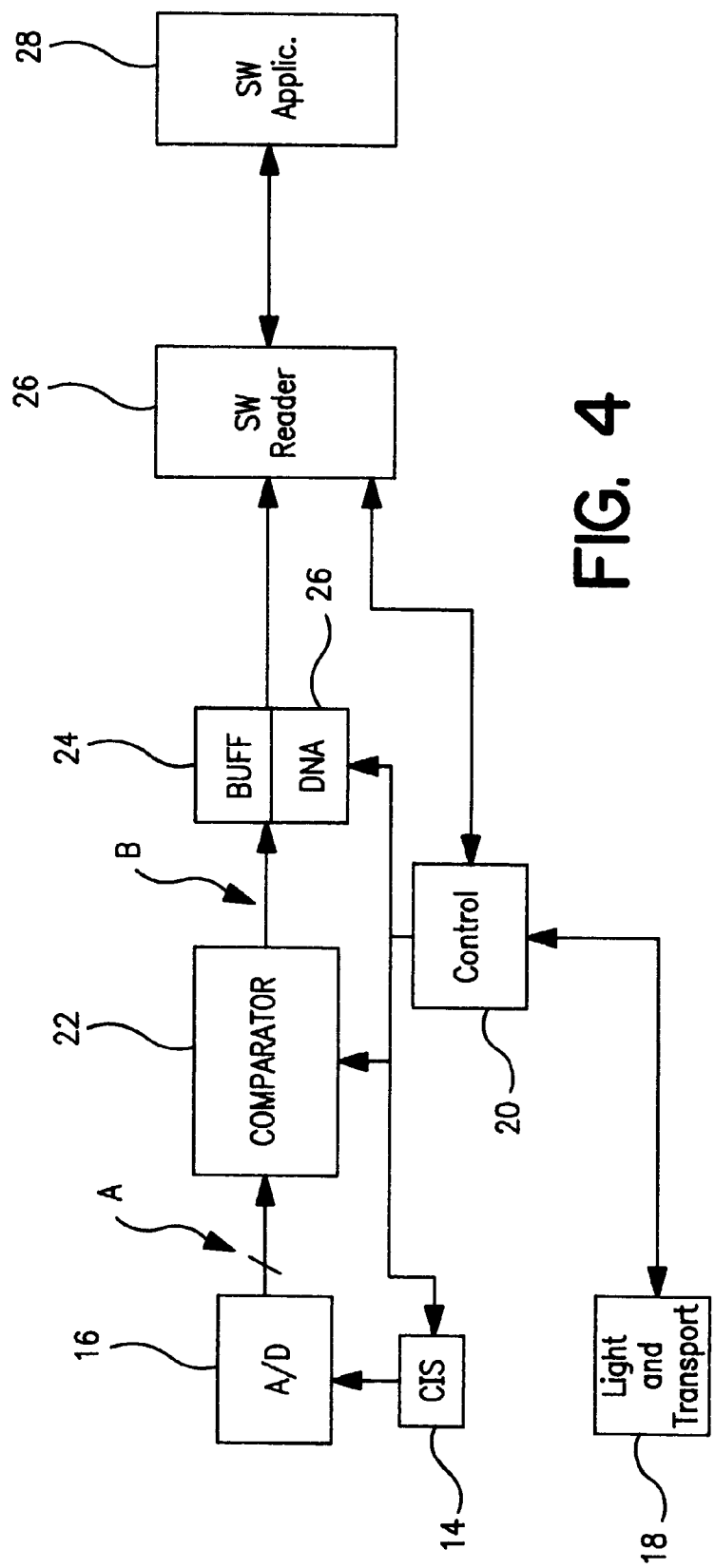
Figure 5:
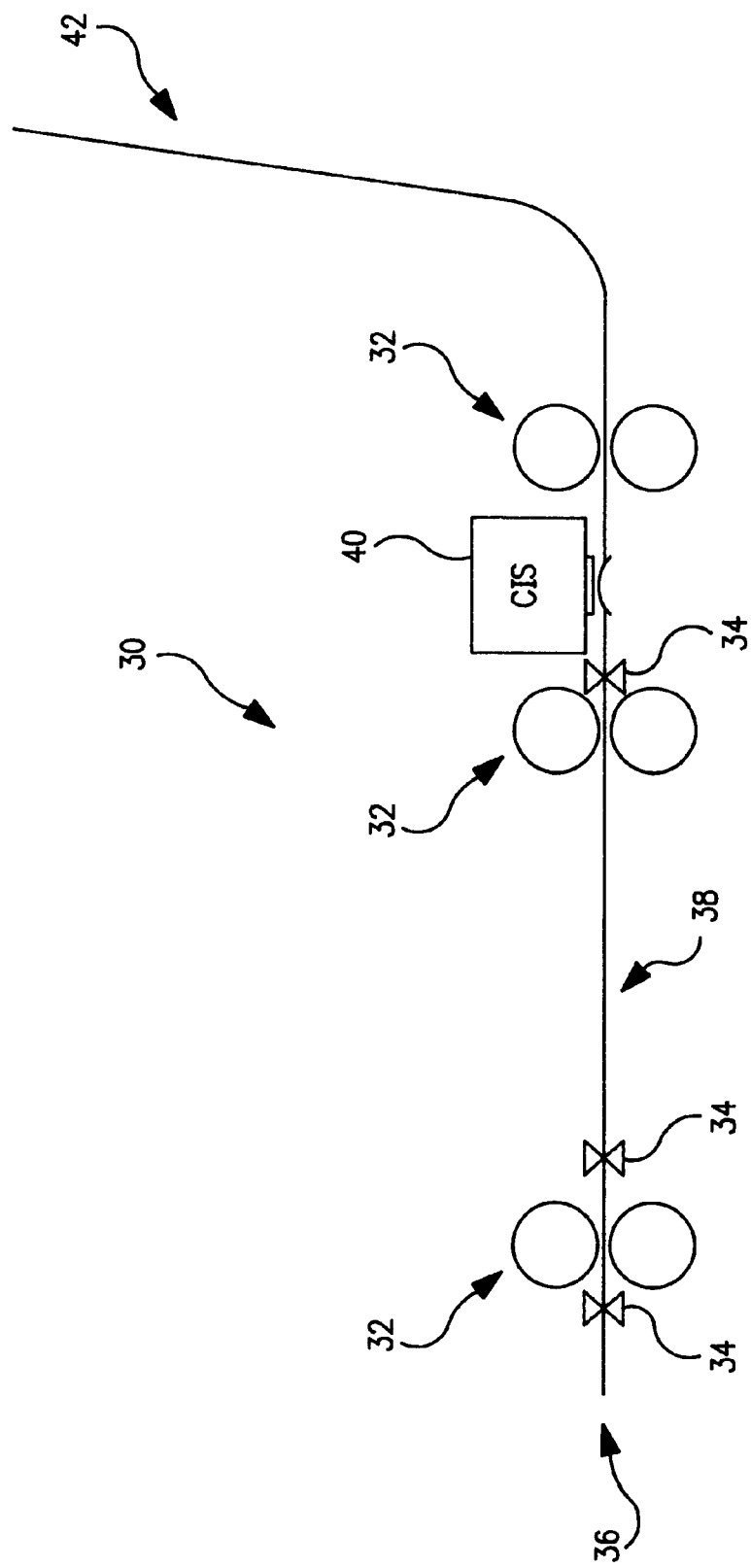

Further advantages and details of the inventive concept will be apparent from the following description of embodiments with the aid of the drawings and in connection with the dependent claims. There is shown in:

FIG. 1 an outline of an image reading apparatus according to an embodiment of the invention;

FIG. 2 a diagram showing in principle the level of a signal delivered from a light detector dependent on the reflective characteristic of the surface, in accordance with an embodiment of the invention;

FIG. 3 another exemplifying diagram showing the signal levels of an embodiment of the invention;

FIG. 4 a block diagram of a circuit for image reading in accordance with an embodiment of the invention;

FIG. 5 an overview of the inventive apparatus applied in a form reader.

The image reading apparatus 1 of FIG. 1 comprises a light sensitive detector 10 coupled to a detector circuit 12 for analysing a detector signal. The light detector 10 is arranged to cooperate with a lens 8 and possibly a light reflecting mirror in order to detect light reflected from an object image 2 that can be transported past a focusing area 7, preferably a point or a line, of the lens and detector arrangement. The object image 2 and in particular the part of the image currently being present in the focusing area, is illuminated from at least two directions simultaneously with light having at least two differing wavelengths or wavelength ranges. The illumination is realised by means of first and second light sources 3 and 4, such a light emitting diodes (LED:s), laser diodes or lamps, being arranged to emit selected differing first and second wavelengths.

FIG. 2 is a diagram showing on the vertical axis the level of a signal delivered from a light detector in response to detected light reflected from the surface of an exemplifying object image. Along the horizontal axis S, parts of the surface being transported past the focusing area of the detector arrangement and having differing reflective characteristics perceived as different colors are depicted as the sequence apparent from the figure S0 symbolises a substantially white background color of the object image, S1 a red pat S2 green and S3 blue.

Assuming the above mentioned relation $V=k*R+m*G$ and that the object image is simultaneously illuminated with red and green light, the white background areas S0 would give rise to a maximum detector output signal Vmax. The surface S1 reflecting red light would at most cause a signal level T1 and the surface S2 reflecting green light would at most cause a signal level T2. A third color, for example blue, as in S3, that at least reflects a part of the green light would at most cause a third signal level T3. The signal levels for red T1 and green T2 are complementary and correspond to the respective calibration factors $k=T1$ and $m=T2$. The calibration factors may be set in order to achieve a color balance that is suitable for a certain purpose or application of the invention.

Thus, setting threshold levels equalling maximum signal levels T1, T2, T3 caused by reflecting light from each respective color enables detection of markings of said colors. In the example of FIG. 2, the signal may in one embodiment be analysed as follows:

If V>T1 then detected surface color is considered red;

If T2<V<T1 then detected surface color is considered green; and

If T3<V<T2 then detected surface color is considered differing from white, red and green;

If V<T3 then detected surface color is considered black.

The above described analysing scheme is based on the assumption that the involved colors of light and reflective characteristics of surfaces are quite distinct within a narrow wavelength range. In reality, light and the reflective characteristics of surfaces are not always so distinct that fixed signal levels are caused, instead coloured light and particular surface colors rather cause signal levels within ranges typical for those colors. However, maximum signal levels T1, T2, T3 caused by differently coloured surfaces may be determined and used to discriminate between colors on the surface.

In another, perhaps more robust embodiment that is useful for applications with less distinct characteristics of light wavelengths and surfaces, upper and lower threshold values around a maximum signal level for a particular color are determined and used for the analysis. An example of such an embodiment for detecting a surface reflecting red is also illustrated in FIG. 2, where an upper threshold value T1max>T1 and a lower threshold value T1min<T1 are selected with the aid of a calibration procedure. In this case the detector output signal V may be analysed as follows:

If V=<T1min then detected surface color considered not red;

If V=>T1min then detected surface color considered red; or

If T1min<V<T1max then detected surface color considered red.

Naturally, the threshold levels for different colors may be set and utilised in a similar manner, however, dependent on the conditions for the particular color and the particular application.

In a third embodiment of the invention, adapted for detecting red and green or black markings on a white sheet of paper, the signal levels are as shown in FIG. 3 in the same manner as in FIG. 2. Thus, an object surface having a substantially white background color W reflects 100% of an illuminating light R+G from red and green light sources. In a realistic application of the invention the color balance setting would for example be: red light 60% corresponding to threshold T1, which in this example is the maximum attainable value for detected red light, and green light 40% corresponding to threshold T2, which in this example is the maximum attainable value for detected green light.

In a calibrated apparatus, an upper threshold value T1max for detecting red markings on the reflecting object surface is in this example set to T1max=85%, and a lower threshold value T1min for green or black markings T1min=55%. A threshold for updates, see further below, is set as update level=95%. In this example, all percentage threshold values refer to the white background light intensity level.

FIG. 4 shows an embodiment of a circuit for realising the inventive method. A contact image sensor (CIS) 14 for reading e.g. a line of a document is coupled to an A/D-converter 16. The A/D-converter outputs at A grey scale image pixels of 6 bits to a comparator 22, in which the pixel values are compared to threshold values as described above and decisions are made with regard to the color of detected marks on the document. In this example the comparator outputs at B pixel data in 2 bits representing 4 possible different states of each pixel to a buffer 24 and a direct memory access (DMA) 26. The pixel data is then passed on to a software reader 26 and a software application 28 where more advanced image processing is carried out. The CIS 14, the comparator 22, the buffer 24, the DMA 26 and the software reader are coupled to a controller, which inter alia controls clock signals and other control signals required by the different components. The controller is also coupled to the illuminating light and document transport 18.

FIG. 5 shows the invention applied in a form reader 30. The form reader comprises a document transport system 38 having an input slot 36 for receiving a document, feed rolls 32, document detectors 34. The CIS 40 is placed in a part of the transport system having well defined distances between the transport track and the CIS 40. After having passed before the CIS, a document is placed in an output stacker 42.

The above described embodiments of the invention are given merely as examples, and it should be appreciated that light sources of other selected colors may be used to analyse object image surfaces with respect to different selected colors without departing from the scope of the invention as defined in the claims.

What is claimed is:

1. A method for reading data on an object document, said data being represented as areas having at least two different colors with different reflective characteristics, comprising the steps of:

illuminating the object document with light having differing first R and second G wavelengths or wavelength ranges corresponding to the reflective characteristics of image data appearing on the object document;

selecting a color balance by setting a first calibration factor k and second calibration factor m<k, such that an intensity level V of light reflected from the illuminated object document is proportional or equal to $k^x R + m^x G$, where $k^x R$ is the intensity contribution due to reflected light of the first wavelength R and $m^x G$ is the intensity contribution due to reflected light of the second wavelength G;

sensing said intensity level of light reflected from the object document;

comparing said intensity level with a first threshold level T1 representative of the maximum attainable intensity level caused by reflected light of said first wavelength or wavelength range R;

determining that said intensity level is caused by first data having a first color corresponding to said first wavelength R, if said intensity level is higher than said first threshold level;

outputting pixel data, indicative of the determined color, to a buffer.

2. The method according to claim 1, comprising the further steps of:

comparing said intensity level with a second threshold level T2 representative of the maximum attainable intensity level caused by reflected light of said second wavelength or wavelength range G, wherein T2<T1;

determining that said intensity level is caused by second data having a second color corresponding to said wavelength G, if said intensity level is lower than said first threshold level T1 and higher than said second threshold level T2.

3. The method according to claim 2, comprising the further step of determining that said intensity level is caused by third data having a third color if said intensity level is lower than said second threshold level T2.

4. The method according to claim 3, comprising the further steps of:

comparing said intensity level with a third threshold level T3 representative of the maximum attainable intensity level caused by reflected light of a third wavelength or wavelength range, wherein T3<T2;

determining that said intensity level is caused by said third data having a third color if said intensity level is higher than said third threshold level T3; and determining that said intensity level is caused by fourth data being black if said intensity level is lower than said third threshold T3.

5. The method according to claim 4, wherein said first wavelength or wavelength range R is within the red spectrum and said second wavelength or wavelength range G is within the green spectrum, and where said third wavelength or wavelength range is within the blue spectrum, partly reflecting light of said second wavelength or wavelength range G.

6. A method for reading data on an object document, said data being represented as areas having at least two different colors with different reflective characteristics, comprising the steps of:

illuminating the object document with light having first R and second G differing wavelengths or wavelength ranges corresponding to the reflective characteristics of image data appearing on the object document;

selecting a color balance by setting a first calibration factor k and second calibration factor m<k, such that the intensity level V of light reflected from the illuminated object document is proportional or equal to $k^x R + m^x G$, where $k^x R$ is the intensity contribution due to reflected light of the first wavelength R and $m^x G$ is the intensity contribution due to reflected light of the second wavelength G;

sensing said intensity level of light reflected from the object document;

comparing said intensity level with a first threshold level T1max being higher than the maximum attainable intensity level T1 caused by reflected light of said first wavelength or wavelength range R, and with a second threshold level T1min being lower than said maximum attainable intensity level T1;

determining that said intensity level is caused by first data having a first color corresponding to said first wavelength or wavelength range R, if said intensity level is lower than said first threshold level T1max but higher than said second threshold level Tmin;

outputting pixel data, indicative of the determined color, to a buffer.

7. The method according to claim 6, further comprising the step of:

determining that said intensity level is caused by second data having a second color, if said intensity level is lower than said second threshold level T1min.

8. An apparatus for reading data on an object document, said data being represented as areas having at least two different reflective characteristics, the apparatus comprising:

light source means devised to illuminate an object document with light having first R and second G differing wavelengths or wavelength ranges corresponding to the reflective characteristics of image data appearing on the object document;

means for selecting a color balance by setting a first calibration factor k and second calibration factor m<k, such that the intensity level V of light reflected from the illuminated object document is proportional or equal to $k^x R + m^x G$, where $k^x R$ is the intensity contribution due to reflected light of the first wavelength R and $m^x G$ is the intensity contribution due to reflected light of the second wavelength G;

means for sensing said intensity level of light reflected from the object document;

means for comparing said intensity level with a first threshold level T1 representative of the maximum attainable intensity level caused by reflected light of said first wavelength or wavelength range R;

means for determining that said intensity level is caused by first data having a first color corresponding to said first wavelength R, if said intensity level is higher than said first threshold level;

means for outputting pixel data, indicative of the determined color, to a buffer.

9. The apparatus according to claim 8, further comprising:

means for comparing said intensity level with a second threshold level T2 representative of the maximum attainable intensity level caused by reflected light of said second wavelength or wavelength range G, wherein T2<T1;

means for determining that said intensity level is caused by second data having a second color corresponding to said second wavelength G, if said intensity level is lower than said first threshold level T1 and higher than said second threshold level T2.

10. The apparatus according to claim 9, further comprising:

means for determining that said intensity level is caused by third data having a third color if said intensity level is lower than said second threshold level T2.

11. The apparatus according to claim 10, further comprising:

means for comparing said intensity level with a third threshold level T3 representative of the maximum attainable intensity level caused by reflected light of a third wavelength or wavelength range, wherein T3<T2;

means for determining that said intensity level is caused by said third data having a third color if said intensity level is higher than said third threshold level T3; and means for determining that said intensity level is caused by fourth data being black if said intensity level is lower than said third threshold T3.

12. The apparatus according to claim 11, wherein said first wavelength or wavelength range R is within the red spectrum and said second wavelength or wavelength range G is within the green spectrum, and where said third wavelength or wavelength range is within the blue spectrum, partly reflecting light of said second wavelength or wavelength range G.

13. An apparatus for reading data on an object document, said data being represented as areas having at least two different reflective characteristics, the apparatus comprising:

light source means devised to illuminate an object document with light having first R and second G differing wavelengths or wavelength ranges corresponding to the reflective characteristics of image data appearing on the object document;

means for selecting a color balance by setting a first calibration factor k and second calibration factor m<k, such that the intensity level V of light reflected from the illuminated object document is proportional or equal to $k^xR+m^xG$, where $k^xR$ is the intensity contribution due to reflected light of the first wavelength R and $m^xG$ is the intensity contribution due to reflected light of the second wavelength G;

means for sensing said intensity level of light reflected from the object document;

means for comparing said intensity level with a first threshold level T1max being higher than the maximum attainable intensity level T1 caused by reflected light of said first wavelength or wavelength range R, and with a second threshold level T1min being lower than said maximum attainable intensity level T1;

means for determining that said intensity level is caused by first data having a first color corresponding to said first wavelength or wavelength range R, if said intensity level is lower than said first threshold level T1max but higher than said second threshold level Tmin;

means for outputting pixel data, indicative of the determined color, to a buffer.

14. The apparatus according to claim 13, further comprising:

means for determining that said intensity level is caused by second data having a second color, if said intensity level is lower than said second threshold level T1min.

* * * * *

UNITED STATES PATENT AND TRADEMARK OFFICE
CERTIFICATE OF CORRECTION

PATENT NO. : 6,111,669
DATED : August 29, 2000
INVENTOR(S) : Nordstrom

It is certified that error appears in the above-identified patent and that said Letters Patent is hereby corrected as shown below:

DRAWINGS:
FIG. 4, change "DNA" to -- DMA --.
FIG. 4, change reference numeral "26" to -- 27 -- to identify box marked "SW Reader".

Column 3,
Line 20, change "such a" to -- such as --.
Line 30, change "figure S0" to -- figure. S0 --.
Line 32, change "pat" to -- part --.

Column 4,
Line 51, change "software reader 26" to -- software reader 27 --.
Line 61, change "The CIS" to -- A CIS --.

Column 5,
Line 14, change "an intensity" to -- the intensity --.
Line 16, change "$k^x + m^x G$" to -- $k*R+m*G$ --.
Lines 18 and 19-20, after "wavelength", insert -- or wavelength ranges --.

Column 6,
Lines 15, 17, 52 and 54, after "wavelength", insert -- or wavelength ranges --.
Lines 14 and 51, change "$k^x R + m^x G$" to -- $k*R+m*G$ --.

Column 8,
Line 11, change "$k^x R + m^x G$" to -- $k*R+m*G$ --.
Lines 12 and 14, after "wavelength", insert -- or wavelength ranges --.

Signed and Sealed this

Sixth Day of May, 2003

JAMES E. ROGAN
*Director of the United States Patent and Trademark Office*